(12) United States Patent
Wang et al.

(10) Patent No.: US 10,500,965 B2
(45) Date of Patent: Dec. 10, 2019

(54) DITHERING A PULSE WIDTH MODULATED BASE FREQUENCY TO REDUCE EV NOISE

(71) Applicant: Ford Global Technologies, LLC, Dearborn, MI (US)

(72) Inventors: Jiyao Wang, Canton, MI (US); Wei Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 468 days.

(21) Appl. No.: 15/366,023

(22) Filed: Dec. 1, 2016

(65) Prior Publication Data

US 2018/0154786 A1 Jun. 7, 2018

(51) Int. Cl.
| H02P 27/08 | (2006.01) |
|---|---|
| B60L 11/18 | (2006.01) |
| H02P 6/28 | (2016.01) |
| B60L 53/14 | (2019.01) |
| B60L 50/51 | (2019.01) |
| B60L 53/24 | (2019.01) |

(52) U.S. Cl.
CPC ......... B60L 11/1814 (2013.01); B60L 50/51 (2019.02); B60L 53/14 (2019.02); B60L 53/24 (2019.02); H02P 6/28 (2016.02); H02P 27/08 (2013.01); B60L 2210/10 (2013.01); Y02T 10/642 (2013.01); Y02T 10/7005 (2013.01); Y02T 10/7072 (2013.01); Y02T 10/7216 (2013.01); Y02T 90/127 (2013.01); Y02T 90/14 (2013.01); Y10S 903/906 (2013.01)

(58) Field of Classification Search
CPC ...... B60L 11/1814; B60L 53/24; B60L 50/51; B60L 53/14; B60L 2210/10; H02P 27/08; H02P 6/28; Y02T 90/127; Y02T 90/14; Y02T 10/642; Y02T 10/7072; Y02T 10/7005; Y02T 10/7216; Y10S 903/906
See application file for complete search history.

(56) References Cited

U.S. PATENT DOCUMENTS

| 4,843,556 A * | 6/1989 | Wakeman | ........... F02D 41/1408 |
| | | | 700/38 |
| 5,857,060 A | 1/1999 | Elliott et al. | |
| 5,886,504 A * | 3/1999 | Scott | .................... B23K 9/1062 |
| | | | 322/15 |
| 6,687,451 B1 * | 2/2004 | Sikora | .................... G02F 1/0123 |
| | | | 398/187 |
| 6,972,539 B1 * | 12/2005 | Codilian | ................. G11B 19/28 |
| | | | 318/432 |
| 8,456,115 B2 * | 6/2013 | Wu | ........................... H02P 6/14 |
| | | | 318/400.13 |

(Continued)

FOREIGN PATENT DOCUMENTS

CN 102882462 A * 1/2013

*Primary Examiner* — Pinping Sun
(74) *Attorney, Agent, or Firm* — David B. Kelley; Brooks Kushman P.C.

(57) ABSTRACT

A vehicle powertrain includes an inverter coupled with an electric machine and a controller. The controller may be configured to dither a base frequency of a pulse width modulated (PWM) signal, by less than an amount that is based on a rotational speed of the machine and the base frequency, to operate the inverter such that energy at sidebands and harmonics of the base frequency are reduced by distributing the energy to reduce audible vibrations of the powertrain.

17 Claims, 8 Drawing Sheets

(56) References Cited

U.S. PATENT DOCUMENTS

| | | | |
|---|---|---|---|
| 8,649,887 B2* | 2/2014 | Schulz | H02P 23/04 |
| | | | 290/40 D |
| 8,723,438 B2* | 5/2014 | Melanson | H02M 1/4225 |
| | | | 315/209 R |
| 8,907,604 B2 | 12/2014 | Miller et al. | |
| 9,912,251 B2* | 3/2018 | Mondal | H02J 9/061 |
| 10,052,969 B2* | 8/2018 | Valeri | B60Q 5/008 |
| 2007/0120511 A1* | 5/2007 | Kobayashi | B62D 5/0466 |
| | | | 318/432 |
| 2008/0298785 A1* | 12/2008 | Patel | H02M 1/14 |
| | | | 388/820 |
| 2011/0141644 A1 | 6/2011 | Hastings et al. | |
| 2013/0200828 A1 | 8/2013 | Miller et al. | |
| 2014/0268954 A1* | 9/2014 | Wei | H02M 7/217 |
| | | | 363/89 |
| 2014/0306630 A1 | 10/2014 | Schwantner et al. | |
| 2015/0175007 A1 | 6/2015 | Matsumoto et al. | |
| 2017/0033722 A1* | 2/2017 | Ochs | H02M 7/537 |
| 2017/0217331 A1* | 8/2017 | Valeri | B60Q 5/008 |

\* cited by examiner

DITHERING A PULSE WIDTH MODULATED BASE FREQUENCY TO REDUCE EV NOISE

TECHNICAL FIELD

This application is generally related to dithering a base frequency of a PWM signal for an electric powertrain and toggling between a DPWM mode and SVPWM mode to reduce audible noise generation from the electric powertrain.

BACKGROUND

Electrified vehicles including hybrid-electric vehicles (HEVs) and battery electric vehicles (BEVs) rely on a traction battery to provide power to a traction motor for propulsion and a power inverter therebetween to convert direct current (DC) power to alternating current (AC) power. The typical AC traction motor is a 3-phase motor that may be powered by 3 sinusoidal signals each driven with 120 degrees phase separation. The traction battery is configured to operate in a particular voltage range and provide a maximum current. The traction battery is alternatively referred to as a high-voltage battery wherein a terminal voltage of a typical traction battery is over 100 Volts DC. However, improved performance of electric machines may be achieved by operating in a different voltage range, typically at voltages greater than the traction battery terminal voltage. Likewise, the current requirements to drive a vehicular electric machine are commonly referred to as high current.

Also, many electrified vehicles include a DC-DC converter, also referred to as a variable voltage converter (VVC), to convert the voltage of the traction battery to an operational voltage level of the electric machine. The electric machine, which may include a traction motor and a generator, may require high voltage and high current. As many systems operate with a single PWM mode at a fixed frequency and due to the voltage and current requirements, the electric powertrain may generate vibrations and audible noise during operation.

SUMMARY

A vehicle powertrain includes an inverter coupled with an electric machine and a controller. The controller may be configured to dither a base frequency of a pulse width modulated (PWM) signal, by less than an amount that is based on a rotational speed of the machine and the base frequency, to operate the inverter such that energy at sidebands and harmonics of the base frequency are reduced by distributing the energy to reduce audible vibrations of the powertrain.

A vehicle includes a powertrain having an inverter coupled with an electric machine and a controller. The controller may be configured to randomly alter a base frequency of a pulse width modulated (PWM) signal for the inverter by less than an amount that is based on a rotational speed of the machine and the base frequency such that energy at sidebands and harmonics of the base frequency are reduced to reduce audible vibrations of the powertrain.

A method of controlling a vehicle powertrain electric machine includes dithering by a controller about a base frequency a pulse width modulated (PWM) signal within a frequency range that is based on a rotational speed of the electric machine to operate the machine to reduce audible vibrations of the powertrain.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Solid state devices (SSD), such as Insulated Gate Bipolar junction Transistors (IGBTs), Metal Oxide Semiconductor Field Effect Transistors (MOSFETs), or Bipolar Junction Transistors (BJTs) are widely used in a variety of automotive and industrial applications, such as electric motor drives, power inverters, DC-DC converters, and power modules. Operation of an IGBT and a MOSFET is voltage controlled, in which the operation is based on a voltage applied to a gate of the IGBT or MOSFET, while operation of a BJT is current controlled, in which the operation is based on a current applied to a base of the BJT. Here, the use of SSDs or high-power relays may be used to control, alter, or modulate a current between a battery and an electric machine of a vehicle.

Figure 1:
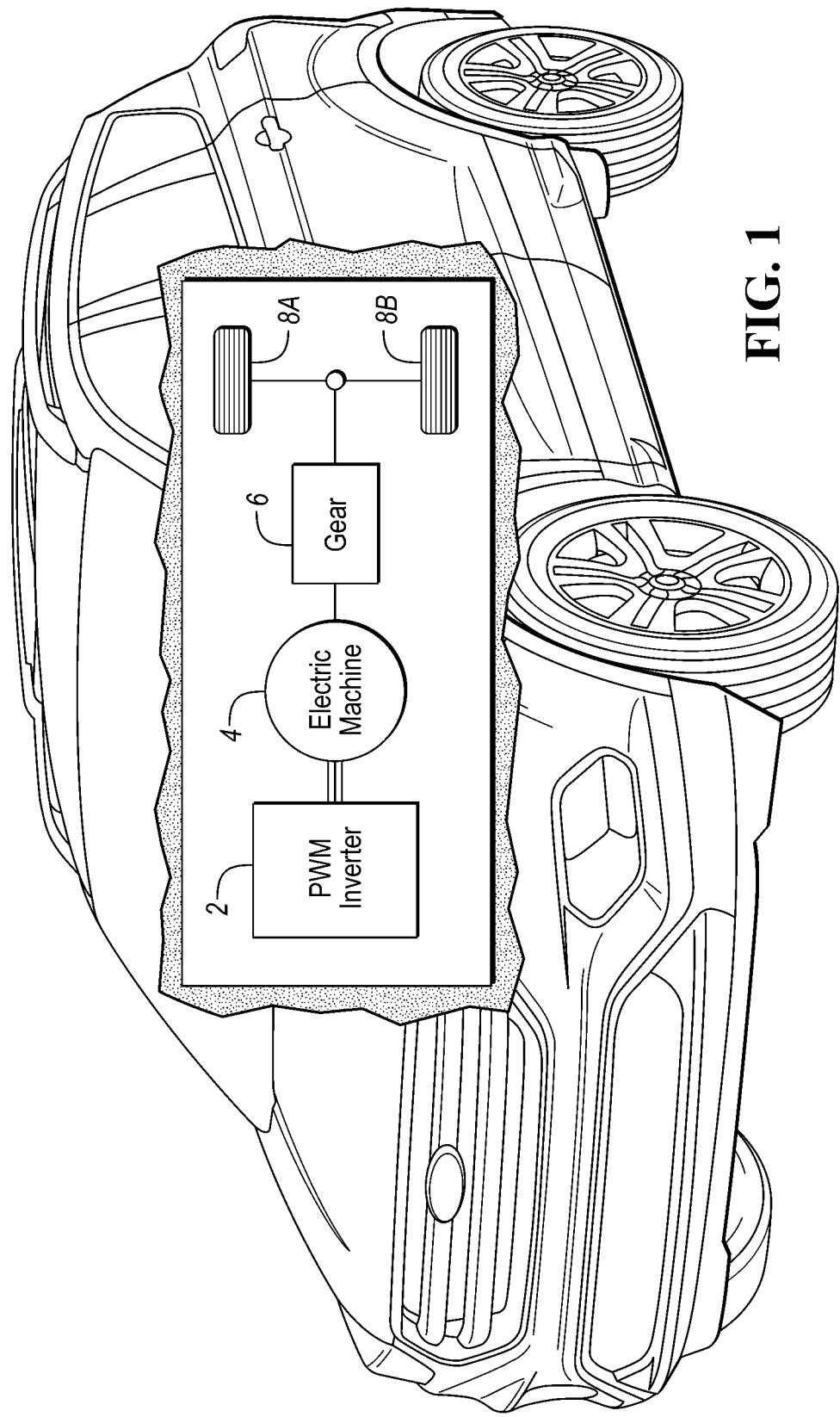
FIG. 1 is a diagram of a hybrid vehicle powertrain that emits audible noise during operation.

FIG. 1 depicts a hybrid vehicle powertrain that emits audible noise during operation. Here a vehicle having a power inverter 2 is coupled with an electric machine 4 that converts electric energy into mechanical energy in the form of a rotating shaft that is coupled with gears 6 to provide a propulsive force to a passenger and driver tire (8A and 8B). Typically the electric machine 4 in a hybrid electric vehicle and/or pure electric vehicle is driven by a PWM inverter 2. The PWM inverter 2 generates electric noise in a machine line to line voltage (Vll). The machine line to line voltage noise excites machine line current noise, which then drives a vibration force thus causing audible noise from the electric machine 4. The machine line to line voltage is the source of electric machine PWM audible noise. Due to the nature of PWM operation, in the machine line to line voltage (Vll) spectrum, most of the electric noise energy is concentrated at specific frequencies; the frequencies are defined as 'PWM sidebands'. Below are two example frequency groups, group 1 are the base frequency of the PWM operation and sideband frequencies. Group 2 are the sideband frequencies of the second harmonic of the base frequency of the PWM operation. Group 1 and Group 2 frequencies are defined below.

Group 1 sideband frequencies: Fs, Fs±2F0, Fs±4F0
Group 2 sideband frequencies: 2Fs±F0, 2Fs±5F0

In which Fs is the PWM switching frequency also referred to as the base frequency and F0 is the fundamental frequency of electric machine. For example, based on a fixed PWM switching frequency, all the Vll electric noise energy is concentrated at PWM sidebands with identical frequencies. Here, to reduce the noise caused by the PWM switching frequency, the base frequency is randomly dithered about the base frequency such that the range of dithering is based on a rotational speed of the electric machine 4. The dithering process includes configuring the PWM inverter is to iteratively find the optimal switching pattern, such that Group1 and Group2 sidebands are evenly distributed. Afterwards, the PWM inverter generates random switching frequencies to spread sideband energy. The outcome of this optimization process is a switching pattern and switching frequency that may achieve optimal PWM spectrum with reduced noise.

Figure 2:
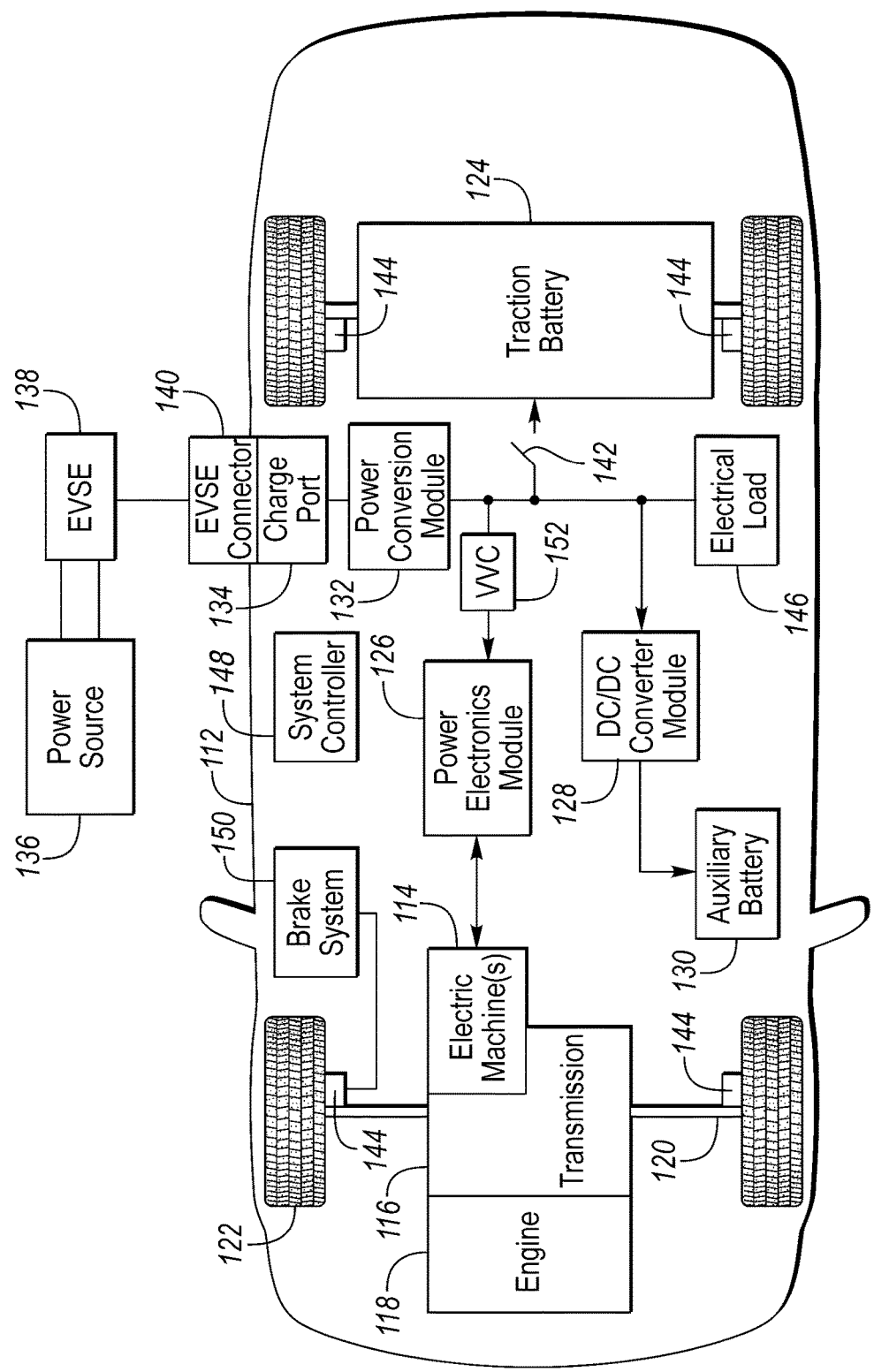
FIG. 2 is a diagram of a hybrid vehicle illustrating typical drivetrain and energy storage components with a variable voltage converter and power inverter therebetween.

FIG. 2 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) 152 electrically coupled between the traction battery 124 and the power electronics module 126. The VVC 152 may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136.

The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 3:
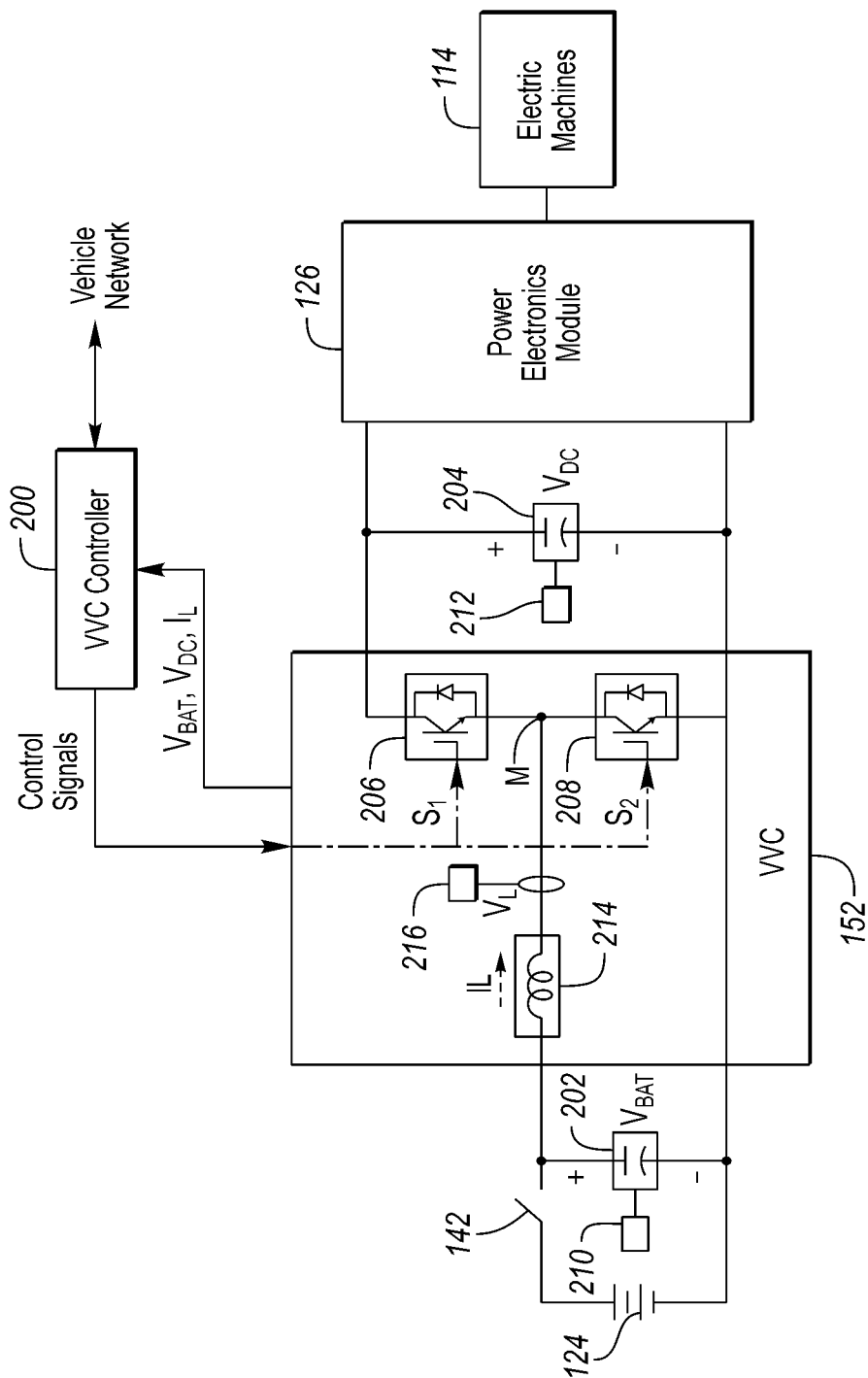
FIG. 3 is a schematic diagram of a vehicular variable voltage converter.

FIG. 3 depicts a diagram of a VVC 152 that is configured as a boost converter. The VVC 152 may include input terminals that may be coupled to terminals of the traction battery 124 through the contactors 142. The VVC 152 may include output terminals coupled to terminals of the power electronics module 126. The VVC 152 may be operated to cause a voltage at the output terminals to be greater than a voltage at the input terminals. The vehicle 112 may include a VVC controller 200 that monitors and controls electrical parameters (e.g., voltage and current) at various locations within the VVC 152. In some configurations, the VVC controller 200 may be included as part of the VVC 152. The VVC controller 200 may determine an output voltage reference, $V^*_{dc}$. The VVC controller 200 may determine, based on the electrical parameters and the voltage reference, $V^*_{dc}$, a control signal sufficient to cause the VVC 152 to achieve the desired output voltage. In some configurations, the control signal may be implemented as a pulse-width modulated (PWM) signal in which a duty cycle of the PWM signal is varied. The control signal may be operated at a predetermined switching frequency. The VVC controller 200 may command the VVC 152 to provide the desired output voltage using the control signal. The particular control signal at which the VVC 152 is operated may be directly related to the amount of voltage boost to be provided by the VVC 152.

The output voltage of the VVC 152 may be controlled to achieve a desired reference voltage. In some configurations, the VVC 152 may be a boost converter. In a boost converter configuration in which the VVC controller 200 controls the duty cycle, the ideal relationship between the input voltage $V_{in}$ and the output voltage $V_{out}$ and the duty cycle D may be illustrated using the following equation:

$$V_{out} = \frac{V_{in}}{(1-D)} \qquad 1)$$

The desired duty cycle, D, may be determined by measuring the input voltage (e.g., traction battery voltage) and setting the output voltage to the reference voltage. The VVC 152 may be a buck converter that reduces the voltage from input to output. In a buck configuration, a different expression relating the input and output voltage to the duty cycle may be derived. In some configurations, the VVC 152 may be a buck-boost converter that may increase or decrease the input voltage. The control strategy described herein is not limited to a particular variable voltage converter topology.

With reference to FIG. 2, the VVC 152 may boost or "step up" the voltage potential of the electrical power provided by the traction battery 124. The traction battery 124 may provide high voltage (HV) DC power. In some configurations, the traction battery 124 may provide a voltage between 150 and 400 Volts. The contactor 142 may be electrically coupled in series between the traction battery 124 and the VVC 152. When the contactor 142 is closed, the HV DC power may be transferred from the traction battery 124 to the VVC 152. An input capacitor 202 may be electrically coupled in parallel to the traction battery 124. The input capacitor 202 may stabilize the bus voltage and reduce any voltage and current ripple. The VVC 152 may receive the HV DC power and boost or "step up" the voltage potential of the input voltage according to the duty cycle.

An output capacitor 204 may be electrically coupled between the output terminals of the VVC 152. The output capacitor 204 may stabilize the bus voltage and reduce voltage and current ripple at the output of the VVC 152.

Further with reference to FIG. 3, the VVC 152 may include a first switching device 206 and a second switching device 208 for boosting an input voltage to provide the boosted output voltage. The switching devices 206, 208 may be configured to selectively flow a current to an electrical load (e.g., power electronics module 126 and electric machines 114). Each switching device 206, 208 may be individually controlled by a gate drive circuit (not shown) of the VVC controller 200 and may include any type of controllable switch (e.g., an insulated gate bipolar transistor (IGBT) or field-effect transistor (FET)). The gate drive circuit may provide electrical signals to each of the switching devices 206, 208 that are based on the control signal (e.g., duty cycle of PWM control signal). A diode may be coupled across each of the switching devices 206, 208. The switching devices 206, 208 may each have an associated switching loss. The switching losses are those power losses that occur during state changes of the switching device (e.g., on/off and off/on transitions). The switching losses may be quantified by the current flowing through and the voltage across the switching device 206, 208 during the transition. The switching devices may also have associated conduction losses that occur when the device is switched on.

The vehicle system may include sensors for measuring electrical parameters of the VVC 152. A first voltage sensor 210 may be configured to measure the input voltage, (e.g., voltage of the battery 124), and provide a corresponding input signal ($V_{bat}$) to the VVC controller 200. In one or more embodiments, the first voltage sensor 210 may measure the voltage across the input capacitor 202, which corresponds to the battery voltage. A second voltage sensor 212 may measure the output voltage of the VVC 152 and provide a corresponding input signal ($V_{dc}$) to the VVC controller 200. In one or more embodiments, the second voltage sensor 212 may measure the voltage across the output capacitor 204, which corresponds to the DC bus voltage. The first voltage sensor 210 and the second voltage sensor 212 may include circuitry to scale the voltages to a level appropriate for the VVC controller 200. The VVC controller 200 may include circuitry to filter and digitize the signals from the first voltage sensor 210 and the second voltage sensor 212.

An input inductor 214 may be electrically coupled in series between the traction battery 124 and the switching devices 206, 208. The input inductor 214 may alternate between storing and releasing energy in the VVC 152 to enable the providing of the variable voltages and currents as VVC 152 output, and the achieving of the desired voltage boost. A current sensor 216 may measure the input current through the input inductor 214 and provide a corresponding current signal ($I_L$) to the VVC controller 200. The input current through the input inductor 214 may be a result of the voltage difference between the input and the output voltage of the VVC 152, the conducting time of the switching devices 206, 208, and the inductance L of the input inductor 214. The VVC controller 200 may include circuitry to scale, filter, and digitize the signal from the current sensor 216.

The VVC controller 200 may be programmed to control the output voltage of the VVC 152. The VVC controller 200 may receive input from the VVC 152 and other controllers via the vehicle network, and determine the control signals. The VVC controller 200 may monitor the input signals ($V_{bat}$, $V_{dc}$, $I_L$, $V^*_{dc}$) to determine the control signals. For example, the VVC controller 200 may provide control signals to the gate drive circuit that correspond to a duty cycle command. The gate drive circuit may then control each switching device 206, 208 based on the duty cycle command.

The control signals to the VVC 152 may be configured to drive the switching devices 206, 208 at a particular switching frequency. Within each cycle of the switching frequency, the switching devices 206, 208 may be operated at the specified duty cycle. The duty cycle defines the amount of time that the switching devices 206, 208 are in an on-state and an off-state. For example, a duty cycle of 100% may operate the switching devices 206, 208 in a continuous on-state with no turn off. A duty cycle of 0% may operate the switching devices 206, 208 in a continuous off-state with no turn on. A duty cycle of 50% may operate the switching devices 206, 208 in an on-state for half of the cycle and in an off-state for half of the cycle. The control signals for the two switches 206, 208 may be complementary. That is, the control signal sent to one of the switching devices (e.g., 206) may be an inverted version of the control signal sent to the other switching device (e.g., 208). The use of complementary control of the switching devices 206, 208 is desirable to avoid a shoot-through condition in which current flows directly through a high-side switching device 206 and a low-side switching device 208. The high-side switching device 206 is also called a pass device 206 and the low-side switching device 208 is also called a charging device 208.

Figure 5:
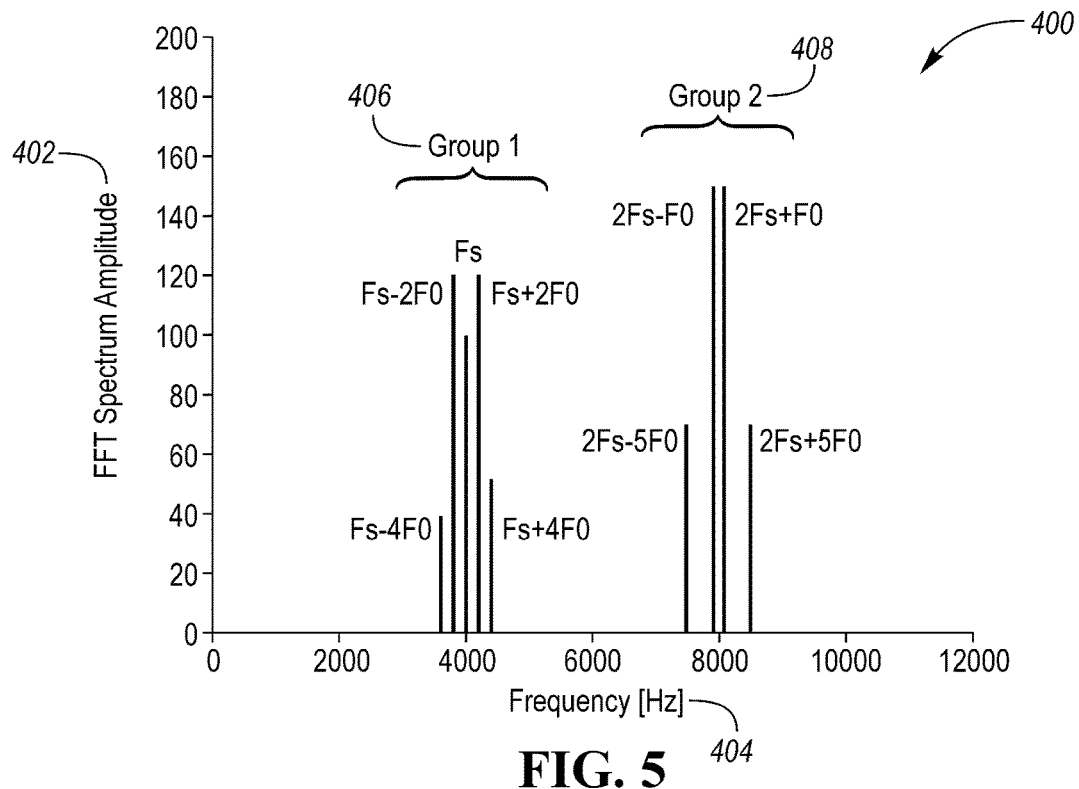
FIG. 5 is a graphical representation of spectrum amplitude with respect to frequency of an electric powertrain operating with a fixed PWM.

The current that is controlled by the switching devices 206, 208 may include a ripple component that has a magnitude that varies with a magnitude of the current, and the duty cycle and switching frequency of the switching devices 206, 208. Relative to the input current, the worst case ripple current magnitude occurs during relatively high input current conditions. When the duty cycle is fixed, an increase in the inductor current causes an increase in magnitude of the ripple current as illustrated in FIG. 5. The magnitude of the ripple current is also related to the duty cycle. The highest magnitude ripple current occurs when the duty cycle equals 50%. The general relationship between the inductor ripple current magnitude and the duty cycle may be as shown in FIG. 5. Based on these facts, it may be beneficial to implement measures to reduce the ripple current magnitude under high current and mid-range duty cycle conditions.

When designing the VVC 152, the switching frequency and the inductance value of the inductor 214 may be selected to satisfy a maximum allowable ripple current magnitude. The ripple component may be a periodic variation that appears on a DC signal. The ripple component may be defined by a ripple component magnitude and a ripple component frequency. The ripple component may have harmonics that are in an audible frequency range that may add to the noise signature of the vehicle. Further, the ripple component may cause difficulties with accurately controlling devices fed by the source. During switching transients, the switching devices 206, 208 may turn off at the maximum inductor current (DC current plus ripple current) which may cause large voltage spike across the switching devices 206, 208. Because of size and cost constraints, the inductance value may be selected based on the conducted current. In general, as current increases the inductance may decrease due to saturation.

The switching frequency may be selected to limit a magnitude of the ripple current component under worst case scenarios (e.g., highest input current and/or duty cycle close to 50% conditions). The switching frequency of the switching devices 206, 208 may be selected to be a frequency (e.g., 10 kHz) that is greater than a switching frequency of the motor/generator inverter (e.g., 5 kHz) that is coupled to an output of the VVC 152. In some applications, the switching frequency of the VVC 152 may be selected to be a predetermined fixed frequency. The predetermined fixed frequency is generally selected to satisfy noise and ripple current specifications. However, the choice of the predetermined fixed frequency may not provide best performance over all operating ranges of the VVC 152. The predetermined fixed frequency may provide best results at a particular set of operating conditions, but may be a compromise at other operating conditions.

Increasing the switching frequency may decrease the ripple current magnitude and lower voltage stress across the switching devices 206, 208, but may lead to higher switching losses. While the switching frequency may be selected for worst case ripple conditions, the VVC 152 may only operate under the worst case ripple conditions for a small percentage of the total operating time. This may lead to unnecessarily high switching losses that may lower fuel economy. In addition, the fixed switching frequency may concentrate the noise spectrum in a very narrow range. The increased noise density in this narrow range may result in noticeable noise, vibration, and harshness (NVH) issues.

The VVC controller 200 may be programmed to vary the switching frequency of the switching devices 206, 208 based on the duty cycle and the input current. The variation in switching frequency may improve fuel economy by reducing switching losses and reduce NVH issues while maintaining ripple current targets under worst case operating conditions.

During relatively high current conditions, the switching devices 206, 208 may experience increased voltage stress. At a maximum operating current of the VVC 152, it may be desired to select a relatively high switching frequency that reduces the ripple component magnitude with a reasonable level of switching losses. The switching frequency may be selected based on the input current magnitude such that as the input current magnitude increases, the switching frequency increases. The switching frequency may be increased up to a predetermined maximum switching frequency. The predetermined maximum switching frequency may be a level that provides a compromise between lower ripple component magnitudes and higher switching losses. The switching frequency may be changed in discrete steps or continuously over the operating current range.

The VVC controller 200 may be programmed to reduce the switching frequency in response to the current input being less than a predetermined maximum current. The predetermined maximum current may be a maximum operating current of the VVC 152. The change in the switching frequency may be based on the magnitude of the current input to the switching devices 206, 208. When the current is greater than the predetermined maximum current, the switching frequency may be set to a predetermined maximum switching frequency. As the current decreases, the magnitude of the ripple component decreases. By operating at lower switching frequencies as the current decreases, switching losses are reduced. The switching frequency may be varied based on the power input to the switching devices. As the input power is a function of the input current and the battery voltage, the input power and input current may be used in a similar manner.

Since the ripple current is also affected by the duty cycle, the switching frequency may be varied based on the duty cycle. The duty cycle may be determined based on a ratio of the input voltage to the output voltage. As such, the switching frequency may also be varied based on the ratio between the input voltage and the output voltage. When the duty cycle is near 50%, the predicted ripple current magnitude is a maximum value and the switching frequency may be set to the predetermined maximum frequency. The predetermined maximum frequency may be a maximum switching frequency value that is selected to minimize the ripple current magnitude. The switching frequency may be changed in discrete steps or continuously over the duty cycle range.

The VVC controller 200 may be programmed to reduce the switching frequency from the predetermined maximum frequency in response to a magnitude of a difference between the duty cycle and the duty cycle value (e.g, 50%) at which the predicted ripple component magnitude is a maximum. When the magnitude of the difference is less than a threshold, the switching frequency may be set to the predetermined frequency. When the magnitude of the difference decreases, the switching frequency may be increased toward the predetermined maximum frequency to reduce the ripple component magnitude. When the magnitude of the difference is less than a threshold, the switching frequency may be set to the predetermined maximum frequency.

The switching frequency may be limited to be between the predetermined maximum frequency and a predetermined minimum frequency. The predetermined minimum frequency may be a frequency level that is greater than a predetermined switching frequency of the power electronic module 126 that is coupled to an output of the variable voltage converter 152. The switching frequency may also be based on parasitic inductance associated with the gate of the IGBT.

Figure 4:
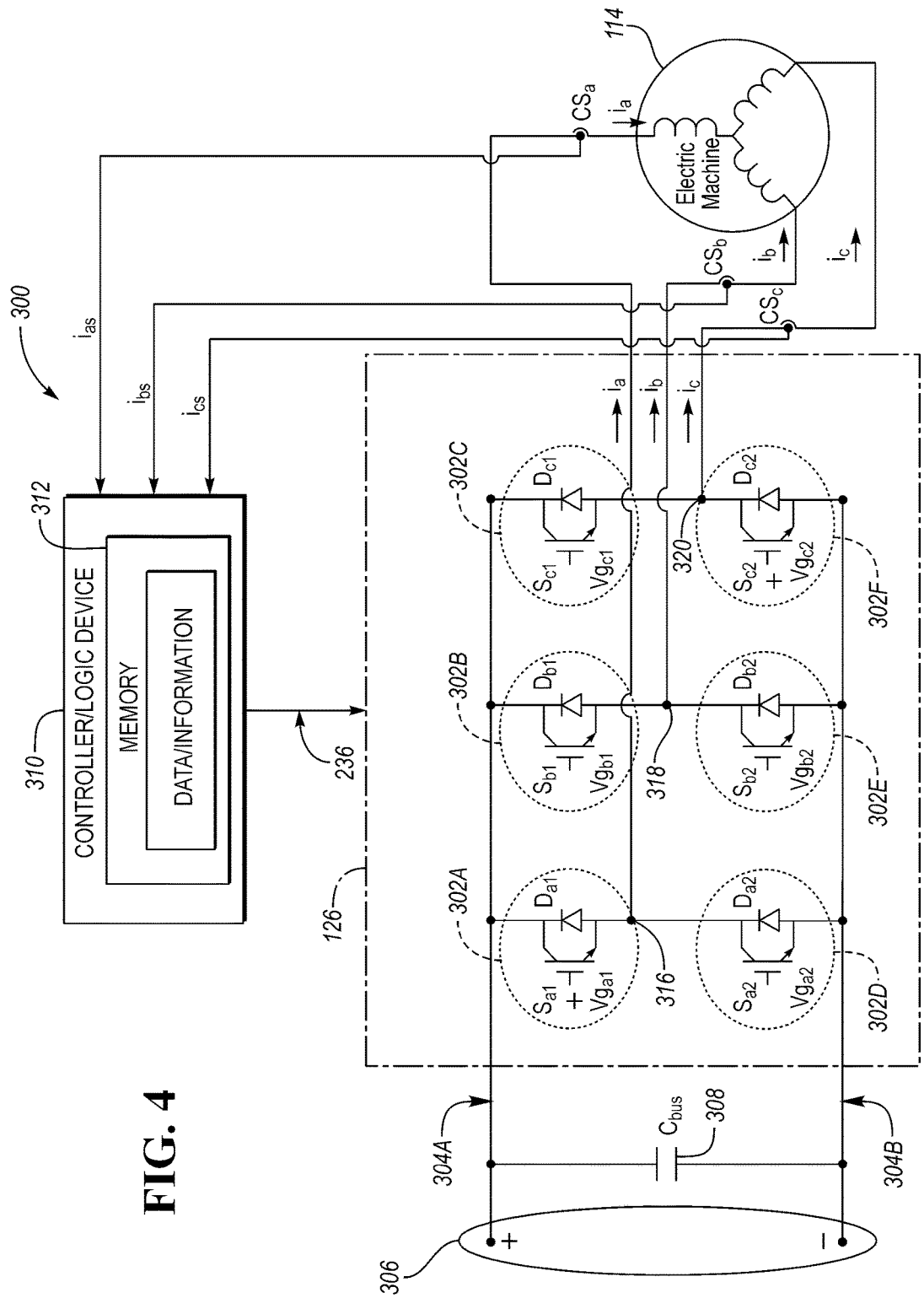
FIG. 4 is a schematic diagram of a vehicular power inverter and electric machine.

With reference to FIG. 4, a system 300 is provided for controlling a power electronics module (PEM) 126. The PEM 126 of FIG. 4 is shown to include a plurality of switches 302 (e.g., IGBTs) configured to collectively operate as an inverter with first, second, and third phase legs 316, 318, 320. While the inverter is shown as a three-phase converter, the inverter may include additional phase legs. For example, the inverter may be a four-phase converter, a five-phase converter, a six-phase converter, etc. In addition, the PEM 126 may include multiple converters with each inverter in the PEM 126 including three or more phase legs. For example, the system 300 may control two or more inverters in the PEM 126. The PEM 126 may further include a DC to DC converter having high power switches (e.g., IGBTs) to convert a power electronics module input voltage to a power electronics module output voltage via boost, buck or a combination thereof.

As shown in FIG. 4, the inverter may be a DC-to-AC converter. In operation, the DC-to-AC converter receives DC power from a DC power link 306 through a DC bus 304 and converts the DC power to AC power. The AC power is transmitted via the phase currents ia, ib, and ic to drive an AC machine also referred to as an electric machine 114, such as a three-phase permanent-magnet synchronous motor (PMSM) as depicted in FIG. 4. In such an example, the DC power link 306 may include a DC storage battery to provide DC power to the DC bus 304. In another example, the inverter may operate as an AC-to-DC converter that converts AC power from the AC machine 114 (e.g., generator) to DC power, which the DC bus 304 can provide to the DC power link 306. Furthermore, the system 300 may control the PEM 126 in other power electronic topologies.

With continuing reference to FIG. 4, each of the phase legs 316, 318, 320 in the inverter includes power switches 302, which may be implemented by various types of controllable switches. In one embodiment, each power switch 302 may include a diode and a transistor, (e.g., an IGBT). The diodes of FIG. 4 are labeled $D_{a1}$, $D_{a2}$, $D_{b1}$, $D_{b2}$, $D_{c1}$, and $D_{c2}$ while the IGBTs of FIG. 4 are respectively labeled $S_{a1}$, $S_{a2}$, $S_{b1}$, $S_{b2}$, $S_{c1}$, and $S_{c2}$. The power switches $S_{a1}$, $S_{a2}$, $D_{a1}$, and $D_{a2}$ are part of phase leg A of the three-phase converter, which is labeled as the first phase leg A 316 in FIG. 4. Similarly, the power switches $S_{b1}$, $S_{b2}$, $D_{b1}$, and $D_{b2}$ are part of phase leg B 318 and the power switches $S_{c1}$, $S_{c2}$, $D_{c1}$, and $D_{c2}$ are part of phase leg C 320 of the three-phase converter. The inverter may include any number of the power switches 302 or circuit elements depending on the particular configuration of the inverter. The diodes ($D_{xx}$) are connected in parallel with the IGBTs ($S_{xx}$) however, as the polarities are reversed for proper operation, this configuration is often referred to as being connected anti-parallel. A diode in this anti-parallel configuration is also called a freewheeling diode.

As illustrated in FIG. 4, current sensors $CS_a$, $CS_b$, and $CS_c$ are provided to sense current flow in the respective phase legs 316, 318, 320. FIG. 4 shows the current sensors $CS_a$, $CS_b$, and $CS_c$ separate from the PEM 126. However, current sensors $CS_a$, $CS_b$, and $CS_c$ may be integrated as part of the PEM 126 depending on its configuration. Current sensors $CS_a$, $CS_b$, and $CS_c$ of FIG. 4 are installed in series with each of phase legs A, B and C (i.e., phase legs 316, 318, 320 in FIG. 4) and provide the respective feedback signals $i_{as}$, $i_{bs}$, and $i_{cs}$ (also illustrated in FIG. 4) for the system 300. The feedback signals $i_{as}$, $i_{bs}$, and $i_{cs}$ may be raw current signals processed by logic device (LD) 310 or may be embedded or encoded with data or information about the current flow through the respective phase legs 316, 318, 320. Also, the power switches 302 (e.g., IGBTs) may include current sensing capability. The current sensing capability may include being configured with a current mirror output, which may provide data/signals representative of $i_{as}$, $i_{bs}$, and $i_{cs}$. The data/signals may indicate a direction of current flow, a magnitude of current flow, or both the direction and magnitude of current flow through the respective phase legs A, B, and C.

Referring again to FIG. 4, the system 300 includes a logic device (LD) or controller 310. The controller or LD 310 can be implemented by various types or combinations of electronic devices and/or microprocessor-based computers or controllers. To implement a method of controlling the PEM 126, the controller 310 may execute a computer program or algorithm embedded or encoded with the method and stored in volatile and/or persistent memory 312. Alternatively, logic may be encoded in discrete logic, a microprocessor, a microcontroller, or a logic or gate array stored on one or more integrated circuit chips. As shown in the embodiment of FIG. 4, the controller 310 receives and processes the feedback signals $i_{as}$, $i_{bs}$, and $i_{cs}$ to control the phase currents $i_a$, $i_b$, and $i_c$ such that the phase currents $i_a$, $i_b$, and $i_c$ flow through the phase legs 316, 318, 320 and into the respective windings of the electric machine 114 according to various current or voltage patterns. For example, current patterns can include patterns of phase currents $i_a$, $i_b$, and $i_c$ flowing into and away from the DC-bus 304 or a DC-bus capacitor 308. The DC-bus capacitor 308 of FIG. 4 is shown separate from the PEM 126. However, the DC-bus capacitor 308 may be integrated as part of the PEM 126.

As shown in FIG. 4, a storage medium 312 (hereinafter "memory"), such as computer-readable memory may store the computer program or algorithm embedded or encoded with the method. In addition, the memory 312 may store data or information about the various operating conditions or components in the PEM 126. For example, the memory 312 may store data or information about current flow through the respective phase legs 316, 318, 320. The memory 312 can be part of the controller 310 as shown in FIG. 4. However, the memory 312 may be positioned in any suitable location accessible by the controller 310.

As illustrated in FIG. 4, the controller 310 transmits at least one control signal 236 to the power converter system 126. The power converter system 126 receives the control signal 322 to control the switching configuration of the inverter and therefore the current flow through the respective phase legs 316, 318, and 320. The switching configuration is a set of switching states of the power switches 302 in the inverter. In general, the switching configuration of the inverter determines how the inverter converts power between the DC power link 306 and the electric machine 114.

To control the switching configuration of the inverter, the inverter changes the switching state of each power switch 302 in the inverter to either an ON state or an OFF state based on the control signal 322. In the illustrated embodiment, to switch the power switch 302 to either ON or OFF states, the controller/LD 310 provides the gate voltage (Vg) to each power switch 302 and therefore drives the switching state of each power switch 302. Gate voltages $Vg_{a1}$, $Vg_{a2}$, $Vg_{b1}$, $Vg_{b2}$, $Vg_{c1}$, and $Vg_{c2}$ (shown in FIG. 4) control the switching state and characteristics of the respective power switches 302. While the inverter is shown as a voltage-driven device in FIG. 4, the inverter may be a current-driven device or controlled by other strategies that switch the power switch 302 between ON and OFF states. The controller 310 may change the gate drive for each IGBT based on the rotational speed of the electric machine 114, the mirror current, or a temperature of the IGBT switch. The change in gate drive may be selected from a plurality of gate drive currents in which the change gate drive current is proportional to a change in IGBT switching speed.

As also shown in FIG. 4, each phase leg 316, 318, and 320 includes two switches 302. However, only one switch in each of the legs 316, 318, 320 can be in the ON state without shorting the DC power link 306. Thus, in each phase leg, the switching state of the lower switch is typically opposite the switching state of the corresponding upper switch. The top switches are typically referred to as high-side switches (i.e., 302A, 302B, 302C) and the lower switches are typically referred to as low-side switches (i.e., 302D, 302E, 302F). Consequently, a HIGH state of a phase leg refers to the upper switch in the leg in the ON state with the lower switch in the OFF state. Likewise, a LOW state of the phase leg refers to the upper switch in the leg in the OFF state with the lower switch in the ON state. As a result, IGBTs with current mirror capability may be on all IGBTs, a subset of IGBTs (e.g., $S_{a1}$, $S_{b1}$, $S_{c1}$) or a single IGBT.

Two situations can occur during an active state of the three-phase converter example illustrated in FIG. 2: (1) two phase legs are in the HIGH state while the third phase leg is in the LOW state, or (2) one phase leg is in the HIGH state while the other two phase legs are in the LOW state. Thus, one phase leg in the three-phase converter, which may be defined as the "reference" phase for a specific active state of the inverter, is in a state opposite to the other two phase legs, or "non-reference" phases, that have the same state. Consequently, the non-reference phases are either both in the HIGH state or both in the LOW state during an active state of the inverter.

FIG. 5 is a graphical representation 400 of spectrum amplitude 402 with respect to frequency 404 of an electric powertrain operating with a fixed PWM. As described above, the nature of PWM operation is such that most of the electric noise energy is concentrated at PWM sidebands illustrated as Group 1 sideband frequencies 406 being Fs, Fs±2F0, Fs±4F0 and Group 2 sideband frequencies 408 being 2Fs±F0, 2Fs±5F0. Notice how the side bands of the base frequency are even harmonics of the electric machine fundamental frequency (e.g., 2F0 and 4F0) and that the side bands of the second harmonic of the base frequency are odd harmonics of the electric machine fundamental frequency (e.g., F0 and 3F0). However, some electric noise energy may also be at other PWM sidebands such as a $3^{rd}$ or $4^{th}$ harmonic of the base frequency. In this graphical representation 400, a fixed PWM switching frequency shown here at 4 KHz has energy at sidebands Fs+/−2F0, and Fs+/−4F0 in which F0 is the rotational speed (i.e., angular velocity) of the electric machine, shown here at 100 Hz. The magnitude of the sideband and harmonic artifacts of a fixed frequency PWM driven motor is shown in which an amplitude of energy of the sidebands of the base frequency are approximately 120 and the amplitude of energy of the sidebands of the $2^{nd}$ harmonic of the base frequency are approximately 150.

Figure 6:
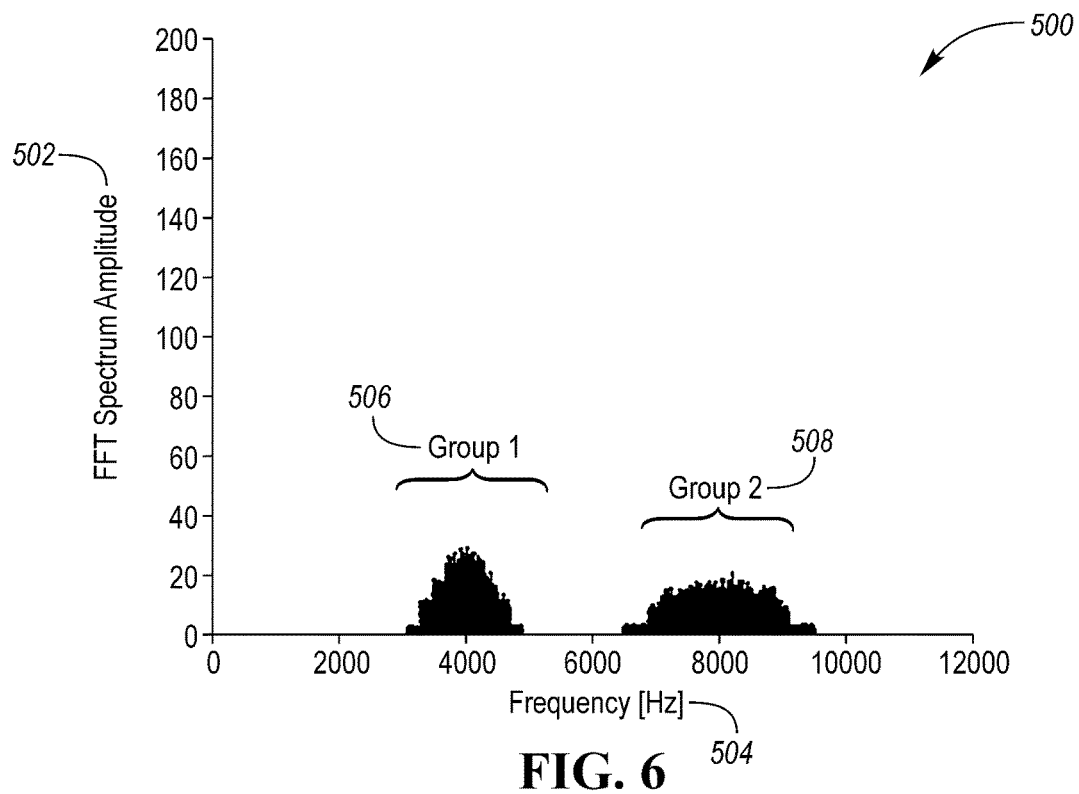
FIG. 6 is a graphical representation of spectrum amplitude with respect to frequency of an electric powertrain operating with a fluctuating frequency PWM.

FIG. 6 is a graphical representation 500 of spectrum amplitude 502 with respect to frequency 504 of an electric powertrain operating with a fluctuating frequency PWM. Here, the PWM switching frequency is random changed within a specific window, so the electric noise energy is no longer concentrated at discrete frequencies. When viewing the amplitude of Group 1 506 and Group 2 508, the energy is spread out thereby reducing the magnitude of the spectrum amplitude in each group. By reducing the magnitude of the amplitude, the audible noise generated by PWM inverter and electric machine is also reduced.

FIG. 6 shows that the use of randomly dithering the base frequency of the PWM signal reduces the amplitude of the base frequency and Group 1 and Group 2 sideband artifacts. However, the shape of FFT spectrum is decided not only by PWM frequency, but also by the machine fundamental frequency F0. Here, a controller is configured to dither the base frequency considering the interaction between Fs and F0, such that the distribution of noise energy achieves an optimal result.

Additionally, it is not possible to manipulate the energy distribution between Group 1 (the sidebands near Fs) and Group 2 (the sidebands near 2Fs) using a random PWM frequency alone. A controller may be configured to perform a 2 part optimization process to reduce audible noise generated by PWM inverter. This optimization process may be implemented by a controller of the PWM inverter or a controller coupled with the PWM inverter.

Figure 7:
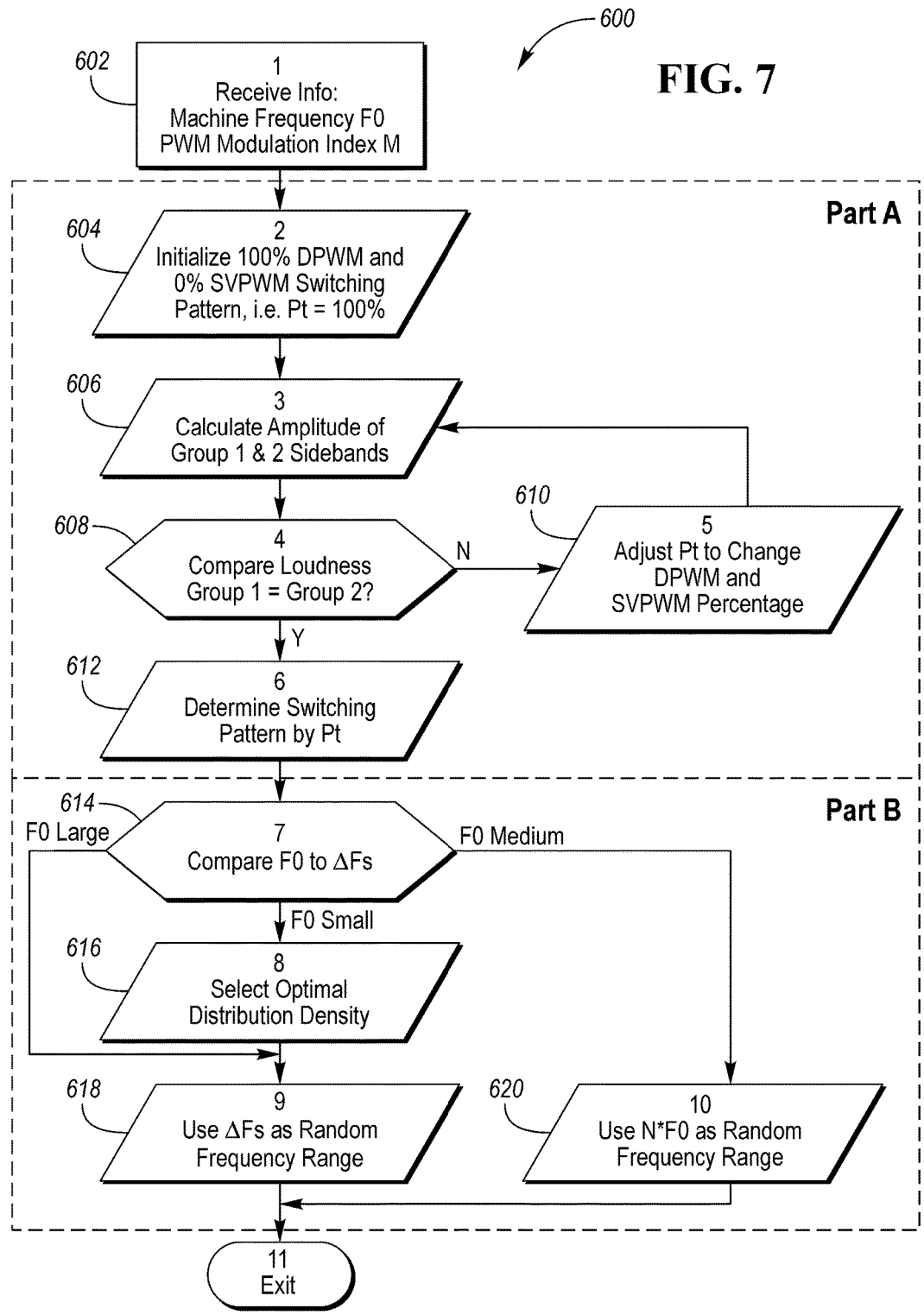
FIG. 7 is a flow diagram of a DC-DC converter control algorithm.

FIG. 7 is a flow diagram 600 of a DC-DC converter control algorithm in which a controller is configured to perform an optimization process in two parts, Part A and Part B. Part A iteratively finds the optimal switching pattern, such that Group1 and Group2 sidebands are evenly distributed. Part B generates random switching frequency to spread sideband energy. The outcome of this optimization process is a switching pattern and switching frequency that may achieve optimal PWM spectrum with reduced noise.

In operation 602, a controller receives data indicative of a machine frequency (e.g., rotational speed of the machine is $2\pi$ frequency) and a pulse width modulation (PWM) modulation index M. After, the controller proceeds to operation 604.

In operation 604, the controller initializes the PWM switching pattern (Pt). The PWM switching pattern is representative of a percentage of time that the inverter operates in a Space Vector PWM (SVPWM) mode and a percentage of time that the inverter operates in a Discontinues PWM (DPWM) mode. Here, Pt is the percentage of time that the inverter operates in a Discontinues PWM (DPWM) mode and (1-Pt) is the percentage of time that the inverter operates in a Space Vector PWM (SVPWM) mode. The controller initializes Pt to 100% (i.e., operates in a DPWM mode) and proceeds to operation 606.

In operation 606, the controller calculates a spectrum amplitude associated with operation of the inverter and the electric machine. The spectrum amplitude may be calculated using a fast Fourier transform (FFT) or other method based on sensor data and proceeds to operation 608.

In operation 608, the controller compares the magnitude of the amplitude of Group 1 frequencies and Group 2 frequencies. Here, the compare checks if the magnitudes are equal or not equal, if the magnitudes are not equal, the controller branches to operation 610 and adjusts the Pt to change the percentage of time the PWM operates in DPWM mode and SVPWM mode and proceeds back to operation 606. While if the magnitudes are equal, the controller branches to operation 612 and sets the switching pattern based on Pt and proceeds to operation 614.

However, in another embodiment, the operation 610 may include a decision tree based on if the magnitude of Group 1 is greater than the magnitude of Group 2. If the magnitude is greater, the controller decreases Pt to increase the percentage of time the PWM operates in SVPWM mode and proceeds back to operation 606. While if the magnitudes less, the controller increases Pt to increase the percentage of time the PWM operates in DPWM mode and proceeds back to operation 606. Once the magnitudes are equal, the controller branches to operation 612 and sets the switching pattern based on Pt and proceeds to operation 614.

In operation 614, the controller will branch based on the fundamental frequency of the electric machine. If the fundamental frequency is small, the controller will branch to operation 616. In operation 616, the controller will select a frequency within the frequency range to dither the base frequency of the PWM to produce an optimal distribution density and then proceed to operation 618. That is, the controller will dither the PWM frequency to produce an optimal distribution density for the given frequency range ΔFs. Often the frequency range may be increased to spread the energy thereby reducing sideband artifacts. If the fundamental frequency is large, the controller will branch to operation 618. In operation 618, the controller will select a frequency range to dither the base frequency of the PWM such that an overlap does not occur as an overlap may lead to spikes in the spectrum amplitude at the overlapping frequency and then exit at block 11. If the fundamental frequency is within an average range, the controller will branch to operation 620. In operation 620, the controller will select a frequency range to dither the base frequency of the PWM using N*F0, such as <2F0 to produce an optimal distribution density and then exit at block 11.

Figure 8:
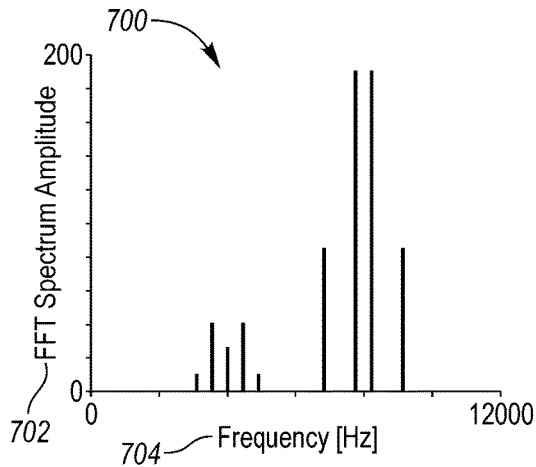
FIG. 8 is a graphical representation of spectrum amplitude with respect to frequency of an electric powertrain operating with a fluctuating frequency PWM that is a Space Vector PWM (SVPWM).
Figure 9:
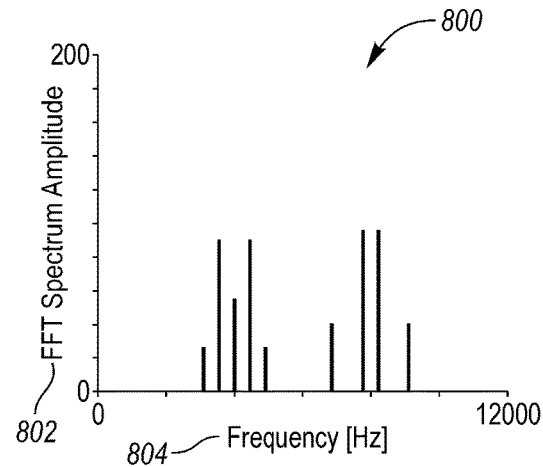
FIG. 9 is a graphical representation of spectrum amplitude with respect to frequency of an electric powertrain operating with a fluctuating frequency PWM that is a Discontinues PWM (DPWM).

FIG. 8 is a graphical representation 700 of spectrum amplitude 702 with respect to frequency 704 of an electric powertrain operating with a fluctuating frequency PWM that is a Space Vector PWM (SVPWM). FIG. 9 is a graphical representation 800 of spectrum amplitude 802 with respect to frequency 804 of an electric powertrain operating with a fluctuating frequency PWM that is a Discontinues PWM (DPWM).

As discussed above, the amplitude of Group1 sidebands may be different from Group2 sidebands that may produce different amplitudes of audible noise. To achieve an optimal PWM pattern, noise within Group1 and Group2 should be of equal loudness. As shown in FIG. 8 and FIG. 9, Space Vector PWM (SVPWM) and Discontinues PWM (DPWM) exhibit different sideband amplitude during similar operating conditions. Generally SVPWM tends to have higher Group2 amplitudes and lower Group1 amplitudes than DPWM.

Here, the controller applies a switching pattern utilizing both SVPWM and DPWM switching modes such that the amplitudes of Group1 and Group2 sidebands can be altered. In one switching cycle, the switching pattern is either SVPWM or DPWM. In multiple switching cycles, the switching pattern can be assigned to either SVPWM or DPWM, or a combination of both. In operation 604 of FIG. 7, Pt is the percentage of DWPM, and (1−Pt) is the percentage of SVPWM. Operations 606, 608, and 610 iteratively adjust the percentage to calculate the optimal Pt that can achieve equal magnitude of Group1 and Group2 sidebands.

Operation 612 generates the switching pattern based on Pt. For example, when Pt=⅔, DPWM will be used twice in every three consecutive switching cycles and SVPWM will be used once in these three cycles. Therefore, over a combination of multiple switching cycles both the SVPWM and DPWM modes contribute to the spectrum. The result is an equal magnitude of Group1 and Group2 noise (to achieve equal magnitude, the Vll spectrum amplitude of Group1 and Group2 may not be equal).

In part B, the PWM spectrum is based on both Fs and F0. To reduce spectrum amplitude and reduce audible noise, Fs is dithered randomly within a range. Every time when the optimization process runs, Fs will be assigned to a new random value.

The random value may be in the range of $$(Fs\_mean - \Delta Fs) < X_{random} < (Fs\_mean + \Delta Fs) \quad (1)$$

in which Fs_mean is the average value or base frequency. It is desirable to use a large random variation $\pm \Delta Fs$, so the noise energy can be distributed over a wider frequency range, and the spectrum amplitude can be reduced. However in practice, $\pm \Delta Fs$ is decided by the physical limits of the PWM inverter. (If Fs is too low, the machine performance degrades. If Fs is too high, the inverter has excessive loss.) As a result, Fs_mean$\pm \Delta Fs$ is a given limit.

Figure 10:
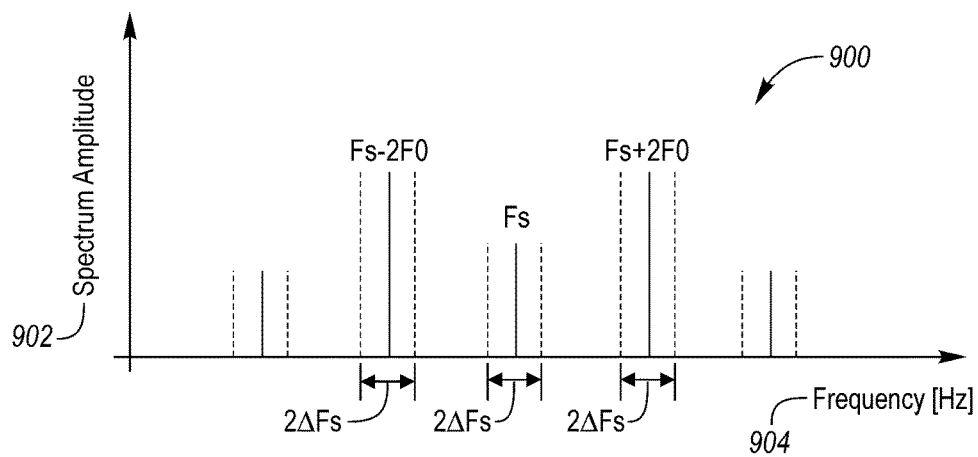
FIG. 10 is a graphical representation of spectrum amplitude with respect to frequency of an electric powertrain operating with a PWM frequency fluctuating around a base frequency that is based on a rotational speed of an electric machine that is greater than the base frequency.
Figure 11:
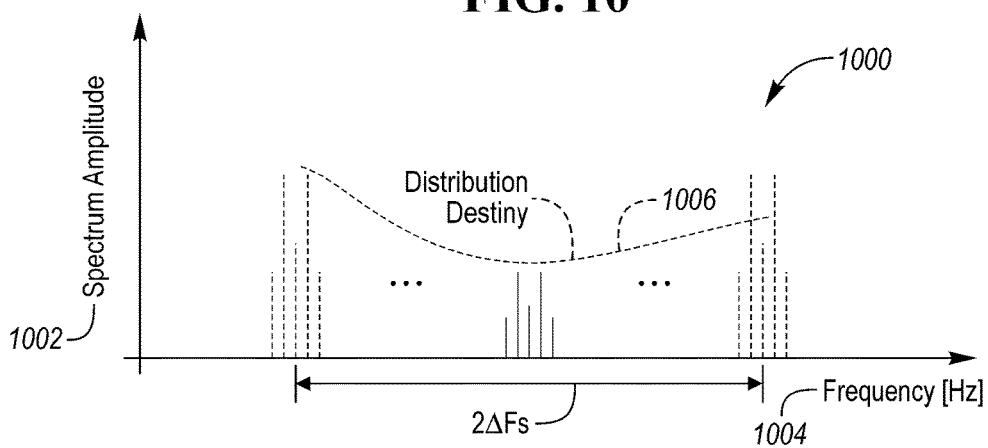
FIG. 11 is a graphical representation of spectrum amplitude with respect to frequency of an electric powertrain operating with a PWM frequency fluctuating around a base frequency that is based on a rotational speed of an electric machine that is less than a fraction of the base frequency.
Figure 12:
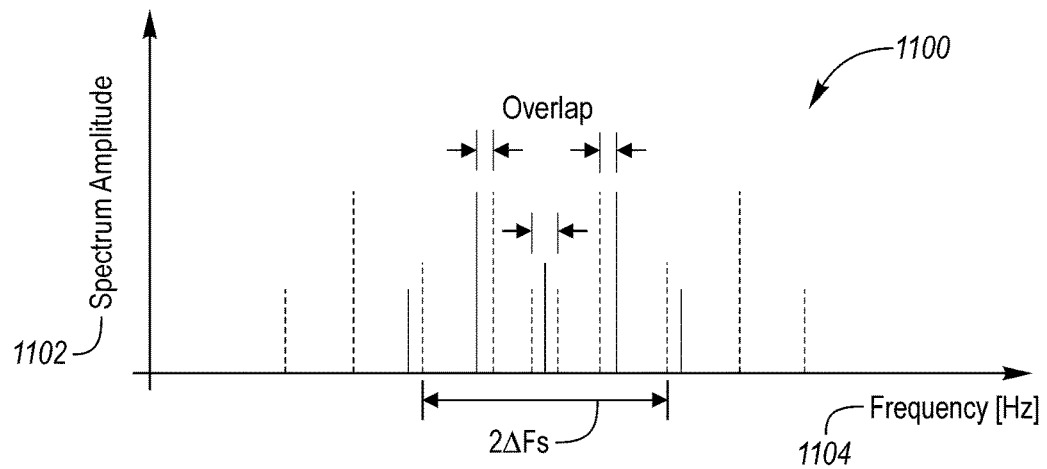
FIG. 12 is a graphical representation of spectrum amplitude with respect to frequency of an electric powertrain operating with a PWM frequency fluctuating around a base frequency that is based on a rotational speed of an electric machine closely proportional to the base frequency.

The optimization process for Group1 may use the same technique as applied to Group2. The optimization may be divided into three difference scenarios, when F0 large, F0 small, and F0 medium. NOTE: FIGS. 10, 11, and 12 are illustrated using different horizontal scales however in those figures, $\Delta F$ is the same range. The horizontal axis is scaled that's why $\Delta Fs$ looks to be different in the figures. But actually they are identical.

FIG. 10 is a graphical representation 900 of spectrum amplitude 902 with respect to frequency 904 of an electric powertrain operating with a PWM frequency fluctuating around a base frequency that is based on a rotational speed of an electric machine that is greater than the base frequency. Here, the rotational speed is expressed as a frequency F0 in which F0 is greater than an upper threshold. The upper threshold is based on the base frequency of the PWM inverter. Considering the spectrum plot 900, the Group1 sidebands are at Fs$\pm$(2*F0) and Fs$\pm$(4*F0). Also, the distance between the Group1 sidebands should be greater than 2$\Delta Fs$. When F0>$\Delta Fs$, the Group1 sidebands will not overlap with each other. To achieve optimal result (i.e. lowest spectrum amplitude with random Fs), the switching frequency should be within a range of Fs_mean$\pm \Delta Fs$ and has a uniform distribution density.

FIG. 11 is a graphical representation 1000 of spectrum amplitude 1002 with respect to frequency 1004 of an electric powertrain operating with a PWM frequency fluctuating around a base frequency that is based on a rotational speed of an electric machine that is less than a fraction of the base frequency. When F0 is small, e.g., F0<$\Delta Fs/n$, the width of sidebands may be too small to play a significant role, in which n of $\Delta Fs/n$ may be the number 2, 3, 4, 5, 6, 7, 8, 9, or 10 as an example. Therefore, to achieve an optimal result, a switching frequency may be within a range between Fs_mean$\pm \Delta Fs$. Additionally, it may be possible to change the shape of Vll spectrum amplitude by assigning an optimal distribution density 1006 of Fs. The optimal distribution density 1006 may be selected by the controller according to operation 616 of FIG. 7.

It is desirable change the shape of the spectrum amplitude as human ears may have a different sensitivity to audible noise at different frequencies. Additionally, the electric machine may generate audible noise at certain frequencies easier than at other frequencies. As a result, at certain frequencies the spectrum amplitude may be inhibited and the amount of energy may then be distributed to other frequency ranges that are not as sensitive to human ears.

FIG. 12 is a graphical representation 1100 of spectrum amplitude 1102 with respect to frequency 1104 of an electric powertrain operating with a PWM frequency fluctuating around a base frequency that is based on a rotational speed of an electric machine closely proportional to the base frequency. Here, the fundamental frequency of the electric machine (F0) is in a medium range. When F0 is in the medium range, for example $\Delta Fs > F0 > \Delta Fs/n$ in which the n is used to select the small range in FIG. 11, F0 is comparable to $\Delta Fs$. The result is that the sidebands may overlap with other sidebands at other random frequencies of Fs. Here, it is desirable to avoid overlapping these sidebands. This is accomplished when the controller selects a random range of Fs, not by Fs_mean$\pm \Delta Fs$, but instead based on a random variation $\pm \Delta Fs$ that may be trimmed to an integer value of F0 such that unnecessary overlapping of a sideband is avoided. Hence the spectrum amplitude caused by sidebands overlap may be reduced. The new narrower switching frequency random range may be Fs_mean$\pm N*F0$, where $N*F0 < \Delta Fs$. For example, the N may be 2, 3, 4, 5, etc.

Figure 13:
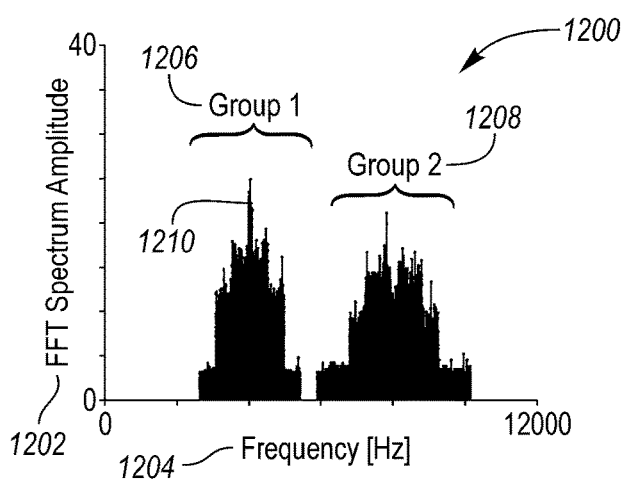
FIG. 13 is a graphical representation of spectrum amplitude with respect to frequency of an electric powertrain operating with a fluctuating frequency PWM such that overlap between the fluctuation range and the rotational speed produce a spike.

FIG. 13 is a graphical representation 1200 of spectrum amplitude 1202 with respect to frequency 1204 of an electric powertrain operating with a fluctuating frequency PWM such that overlap between the fluctuation range and the rotational speed produce a spike. Here, Group 1 sideband frequencies 1206 are around the base frequency (Fs) of the PWM inverter and Group 2 sideband frequencies 1208 are around the second harmonic (2Fs) of the base frequency of the PWM inverter. This in this spectral plot, F0=225 and $\Delta Fs$=500 which is shown to produce sideband overlapping that causes a spike 1210 resulting in increased amplitude audible noise.

Figure 14:
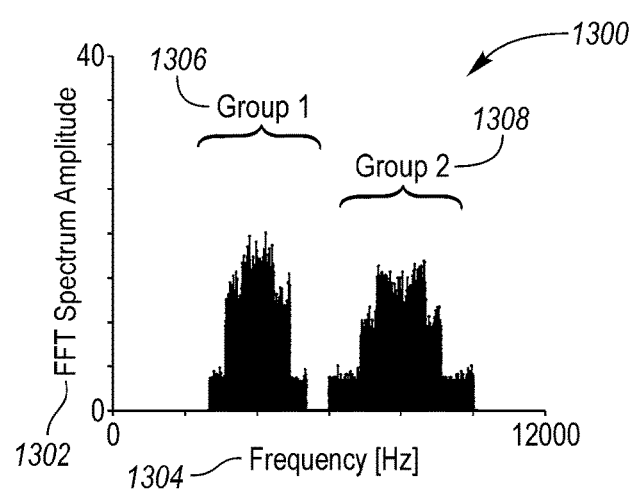
FIG. 14 is a graphical representation of spectrum amplitude with respect to frequency of an electric powertrain operating with a fluctuating frequency PWM such that overlap is avoided by reducing the fluctuation range based on the rotational speed.

FIG. 14 is a graphical representation 1300 of spectrum amplitude 1302 with respect to frequency 1304 of an electric powertrain operating with a fluctuating frequency PWM such that overlap is avoided by reducing the fluctuation range based on the rotational speed. Here, Group 1 sideband frequencies 1306 are around the base frequency (Fs) of the PWM inverter and Group 2 sideband frequencies 1308 are around the second harmonic (2Fs) of the base frequency of the PWM inverter. In this spectral plot, F0=225 and $\Delta Fs$=2*F0=450. The reduction of $\Delta Fs$ spreads the energy over a smaller frequency range, and therefore would have a greater average magnitude. However, the peak spectral amplitude is reduced due to selection of frequency ranges such that there is no sideband overlapping.

Control logic or functions performed by controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle powertrain comprising:
    an inverter coupled with an electric machine; and
    a controller configured to dither a base frequency of a pulse width modulated (PWM) signal, by less than an amount that is based on a rotational speed of the machine and the base frequency, to operate the inverter such that energy, at sidebands and harmonics of the base frequency, is reduced by distributing the energy to reduce audible vibrations of the powertrain, wherein the controller is further configured to increase the amount to a predetermined amount when the rotational speed of the electric machine is less than a fifth of the base frequency.

2. The vehicle powertrain of claim 1, wherein the PWM signal is a Space Vector PWM (SVPWM) signal selected to increase the distribution of the energy at sidebands of a second harmonic of the base frequency.

3. The vehicle powertrain of claim 1, wherein the PWM signal is a Discontinues PWM (DPWM) signal selected to spread energy to sidebands of both the base frequency and a second harmonic of the base frequency.

4. The vehicle powertrain of claim 1, wherein the controller is further configured to toggle the PWM signal between a Space Vector PWM (SVPWM) signal and a Discontinues PWM (DPWM) signal.

5. The vehicle powertrain of claim 4, wherein the controller is further configured to toggle the base frequency based on a percentage to optimize energy spread between the base frequency and a second harmonic of the base frequency.

6. The vehicle powertrain of claim 5, wherein the percentage is based on a base frequency sideband exceeding a second harmonic sideband of the base frequency.

7. The vehicle powertrain of claim 1, wherein the controller is further configured to dither the PWM signal pseudorandomly.

8. The vehicle powertrain of claim 1, wherein the amount is at least 2 times the rotational speed of the electric machine when the rotational speed is greater than the base frequency.

9. The vehicle powertrain of claim 1, wherein the controller is further configured to dither the base frequency based on the rotational speed of the electric machine and the base frequency such that energy at the sidebands does not overlap.

10. A vehicle comprising:
    a powertrain having an inverter coupled with an electric machine; and
    a controller configured to randomly alter a base frequency of a pulse width modulated (PWM) signal for the inverter by less than an amount that is based on a rotational speed of the machine and the base frequency such that energy at sidebands and harmonics of the base frequency are reduced to reduce audible vibrations of the powertrain, wherein the amount is at least 2 times the rotational speed of the electric machine when the rotational speed is greater than the base frequency.

11. The vehicle of claim 10, wherein the PWM signal is a Space Vector PWM (SVPWM) signal selected to increase a distribution of the energy at sidebands of a second harmonic of the base frequency.

12. The vehicle of claim 10, wherein the PWM signal is a Discontinues PWM (DPWM) signal selected to spread energy to sidebands of both the base frequency and a second harmonic of the base frequency.

13. The vehicle of claim 10, wherein the controller is further configured to toggle the PWM signal between a Space Vector PWM (SVPWM) signal and a Discontinues PWM (DPWM) signal.

14. The vehicle of claim 13, wherein the controller is further configured to toggle the base frequency based on a percentage to optimize energy spread between the base frequency and a second harmonic of the base frequency.

15. The vehicle of claim 14, wherein the percentage is based on a base frequency sideband exceeding a second harmonic sideband of the base frequency.

16. A method of controlling a vehicle powertrain electric machine comprising:
 dithering by a controller about a base frequency of a pulse width modulated (PWM) signal within a frequency range that is based on a rotational speed of the electric machine to operate the machine to reduce audible vibrations of the powertrain;
 toggling the PWM signal between a Space Vector PWM (SVPWM) mode and a Discontinues PWM (DPWM) mode based on a percentage of operating time in the SVPWM mode; and
 in response to energy at sidebands of a second harmonic of the base frequency exceeding the energy at sidebands of the base frequency, increasing the percentage of operating time in the SVPWM mode.

17. The method of claim 16, wherein the dithering includes pseudorandomly dithering the PWM signal.

* * * * *